United States Patent [19]

Calkins

[11] Patent Number: 5,330,790
[45] Date of Patent: Jul. 19, 1994

[54] IMPACT IMPLANTATION OF PARTICULATE MATERIAL INTO POLYMER SURFACES

[76] Inventor: Noel C. Calkins, P.O. Box 416, Los Alamos, N. Mex. 87544

[21] Appl. No.: 832,224

[22] Filed: Feb. 7, 1992

[51] Int. Cl.$^5$ .............................................. B05D 1/12
[52] U.S. Cl. .................................. 427/204; 427/205; 427/180; 427/421; 427/427
[58] Field of Search ............... 427/180, 198, 199, 204, 427/205, 427, 428, 600, 369, 525, 359, 365, 421

[56] References Cited

U.S. PATENT DOCUMENTS

| | | | |
|---|---|---|---|
| 2,907,671 | 10/1959 | Duvivier | 427/205 |
| 4,271,045 | 6/1981 | Steigerwald et al. | 427/113 |
| 4,734,302 | 3/1988 | Baskin | 427/198 |
| 4,833,017 | 5/1989 | Benoit | 427/427 |
| 4,960,430 | 10/1990 | Koerber et al. | 427/369 |
| 5,034,245 | 7/1991 | Matsubara | 427/205 |
| 5,130,161 | 7/1992 | Mansur et al. | 427/525 |

Primary Examiner—Shrive Beck
Assistant Examiner—Katherine A. Bavefara
Attorney, Agent, or Firm—William A. Eklund

[57] ABSTRACT

A method of treating the surface of a polymeric article by impact implantation with particulate material to attain hardening, abrasion resistance or other altered surface characteristics. High pressure treatment with a slurry of a liquid mixed with a ceramic particulate material in the 66 to 350 micron particle size range can be employed to implant the surface of a polymeric article to attain improved abrasion and erosion resistance. Similarly impact implantation with electrically conductive or magnetic materials can be employed to attain a conductive surface or a surface having electromagnetic radiation absorption characteristics. In addition to water jet impact implantation, there is disclosed methods of ultrasonic, sheet explosive and mechanical particle implantation.

18 Claims, 3 Drawing Sheets

1

IMPACT IMPLANTATION OF PARTICULATE MATERIAL INTO POLYMER SURFACES

BACKGROUND OF THE INVENTION

1. Field of the Invention

The invention described and claimed herein is generally related to the surface treatment of articles for the purpose of achieving improved surface characteristics for various purposes. More particularly, the present invention is related to surface treatment of polymeric articles, including plastics, elastomers and composites, by impact implantation of particulate materials, particularly hard ceramic particulates and particulates having electrical or magnetic characteristics.

2. Description of Related Art Including Information Disclosed Under 37 CFR 1.97–1.99.

The use of plastics and other polymeric materials in industrial and manufacturing applications is commonly limited by the inherent physical properties of the polymeric materials themselves; including relatively low surface hardness, relatively low softening temperatures, and relatively low tensile strengths as compared with other structural materials such as ceramics and metals.

Some of these characteristics are of particular importance with regard to the surface features of polymeric articles. For example, polymers are frequently unsuited for applications involving polymer-to-polymer rubbing contact, because their low heat conductivity coupled with their relatively low hardness and softening temperatures results in insufficient dissipation of frictional heat, which in turn results in overheating and consequent deformation or welding of the polymeric materials.

Accordingly, it is the object and purpose of the present invention to provide a method of treating the surface of a polymeric material so as to alter the surface characteristics of the material.

More particularly, it is the object and purpose of the present invention to provide a method for the implantation of particulate materials, primarily ceramics but also including metals, into the surface of polymeric and elastomeric materials.

It is also an object and purpose of the present invention to provide a method of attaining desired surface characteristics in an article by applying a coating of a polymeric material on the article and subsequently implanting a particulate material into the polymeric coating by impact implantation.

SUMMARY OF THE INVENTION

In accordance with the present invention, there is provided a method of surface treatment of polymeric articles, comprising the impact implantation of particulate material, such as a ceramic or electrically conductive material, to a depth and concentration sufficient to alter the surface characteristics of the polymeric article.

The present invention is useful for treatment of various polymeric materials, including elastomers and filled or reinforced composite plastics.

Impact implantation is preferably accomplished using a high-pressure fluid medium, either gas or liquid, as a carrier to accelerate and drive the particulate material. Alternatively, ultrasonic, explosive or mechanical application of the particulate material may be employed.

Under appropriate application conditions, implantation of particulate materials into the surface of polymeric articles results in permanent retention of the particulate material, thereby altering the physical characteristics of the surface of the article. Such characteristics as improved resistance to abrasion and erosion, electrical conductivity, and higher surface hardness can be attained.

In accordance with another aspect of the invention, a solid polymeric coating may be applied to an article and the coating then implanted with a particulate material as described above. This method is useful where the underlying article is not adequately susceptible to impact implantation and where a polymer coating having the particulate material implanted therein meets the requirements of the particular industrial application.

These and other aspects of the present invention will be more apparent upon consideration of the following detailed description of the invention, when taken with the accompanying drawings.

BRIEF DESCRIPTION OF THE DRAWINGS

The Figures set forth in the accompanying drawings form a part of this specification and are hereby incorporated by reference. In the Figures.

The accompanying Figures when taken with the following detailed description will enable one of ordinary skill in the art to make and use the present invention.

DESCRIPTION OF THE PREFERRED EMBODIMENT

Figure 1:
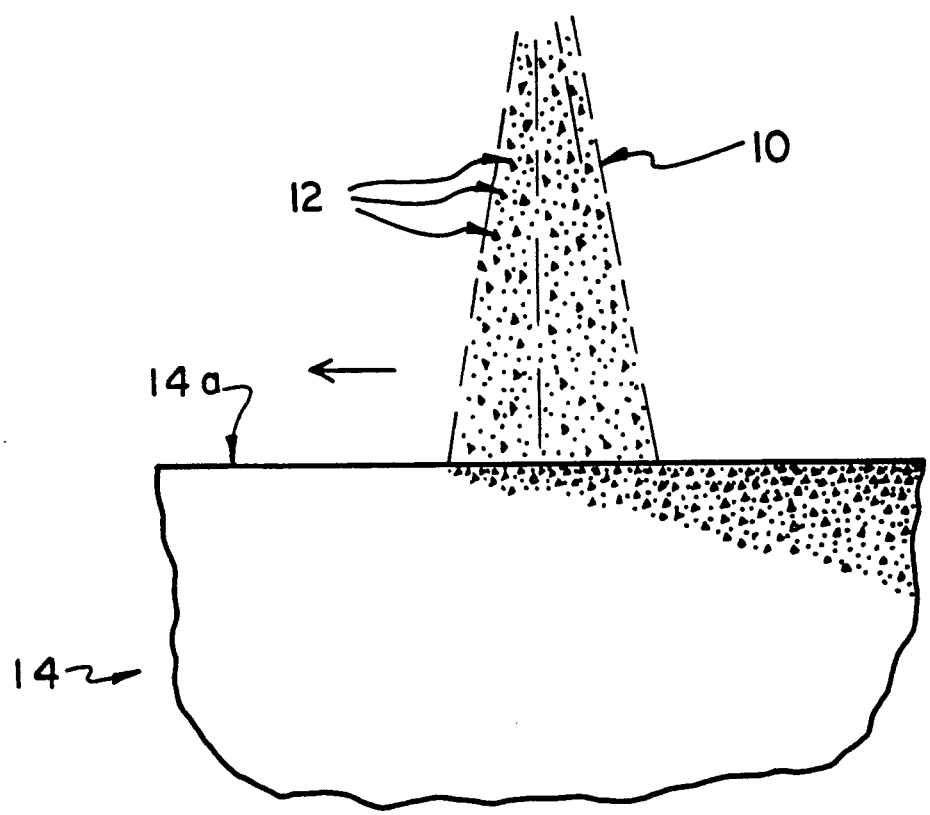
FIG. 1 is a schematic cross sectional illustration, not necessarily to scale, of a polymeric workpiece being implanted with particulate ceramic material carried in a fluid stream in accordance with the present invention.

FIG. 1 illustrates schematically the practice of a preferred embodiment of the method of the present invention. A high pressure stream of water 10 carrying particulate ceramic material 12 is directed at a polymeric workpiece 14. The particles of ceramic material 12 are driven into the workpiece 14, where they are permanently embedded in the workpiece 14 at and below the surface 14a. The particles are permanently retained by plastic deformation of the polymeric material comprising the workpiece 14.

The resulting concentration of the particles of ceramic material 12 embedded in the workpiece 14 will typically be graded within the workpiece 14, being most concentrated at and adjacent to the surface 14a of the workpiece 14 and becoming progressively less concentrated with depth into the workpiece 14. This distribution of particles is a natural consequence of the process of impact implantation and is also the most desired distribution, since the object is to implant the particulate material 12 into workpiece 14 so that the physical characteristics of the ceramic material 12 are imparted to the surface of the workpiece, without affecting the basic physical and structural characteristics of the workpiece 14. The actual surface concentration can be selected by varying such operating parameters as the impact velocity, the particle concentration within the fluid stream, the dispersion and distance of the workpiece 14 from the particulate source, and the exposure time.

Various kinds of particulate material may be embedded in polymers to obtain various desired surface characteristics. For example, hard ceramic materials may be embedded to improve the abrasion resistance of particular polymers. Hard ceramic materials may also be embedded to improve the capacity of a particular polymeric article to withstand friction induced by rubbing against another article formed of the same polymer. In this regard, it will be appreciated that it is well recognized that many of the common engineering and structural polymers are frequently poorly suited to applications that involve polymer-to-polymer friction, because the low heat dissipation capacity of these polymers, coupled with their relatively low softening or melting temperatures, can result in sudden frictional overheating and accompanying failure, welding, or other damage. By choosing and embedding a low friction ceramic material in such materials this problem can be overcome.

Electrically conductive or magnetic particulate materials may also be embedded in polymeric articles by the method of the present invention, for example to render the surface of the article electrically conductive or to impart desired microwave absorption or reflection characteristics to the surface of the article. For example, dielectric absorbers such as carbon, graphite or metallic particles can be embedded in a polymeric matrix to result in microwave absorption by ohmic loss of electromagnetic energy. Similarly, magnetic absorption of microwaves at the surface of a polymer can be attained by implantation with materials having magnetic hysteresis effects, such as carbonyl iron or iron ferrites. Titanium diboride is a particularly useful material in this regard as a consequence of its refractory hardness coupled with high electrical conductivity.

Ordinary refractory ceramics may also be doped with carbides, diborides, and ferrites to achieve electrical conductivity. Suitable electrically conductive materials include carbon, graphite, titanium diboride, metallic particles and mixtures thereof. Suitable particulate materials can also be carbonyl iron, iron ferrite, borides and mixtures thereof.

Finally, particulate materials may be embedded in polymeric articles for purely decorative or other non-functional effects, for example to impart desired color or textural characteristics to the surface of a polymeric article.

The invention may be practiced with the commercially available plastic materials, including the common thermoplastic as well as thermoset plastics, and including filled, reinforced and composite variations of these materials. The invention may find primary application with regard to the advanced and engineering plastics such as the nylons, polyimides and polyetheretherketones, but are also useful with regard to the common commodity plastics, including but not limited to, for example, the polyolefins such as polyethylene and polypropylene, the fluoroplastics, polyamide-imides, polycarbonates, ABS, and others.

The choice of composition of the particulate material for the practice of the present invention will depend on the desired application of the end product. For example, if the object is to impart hardness and abrasion resistance to a relatively soft polymeric workpiece, suitable materials include but are not limited to alumina (aluminum oxide, $Al_2O_3$); boron carbide (BC); silicon carbide (SIC); titanium diboride ($TiB_2$); boron nitride (BN); quartz ($SiO_2$) garnet and zircon and mixtures thereof, including where applicable the various crystalline species of these compounds. Certain proprietary hard materials may also be used, for example the silica/alumina nitride and oxide compositions that are commercially available under various trade names.

Fluid impact implantation may be achieved using a modification of existing water jet cutting technology. In this regard, high pressure water jet equipment has been used for some time as an alternative to conventional cutting tools. One primary advantage of water jet cutting technology is that it effects cutting of materials with no generation of heat, and is thus well suited to cutting of polymeric materials that might otherwise be susceptible to spalling, welding or other forms of heat damage. With appropriate modifications, the technology and equipment developed to support water jet cutting is particularly useful in practicing the present invention.

Figure 2:
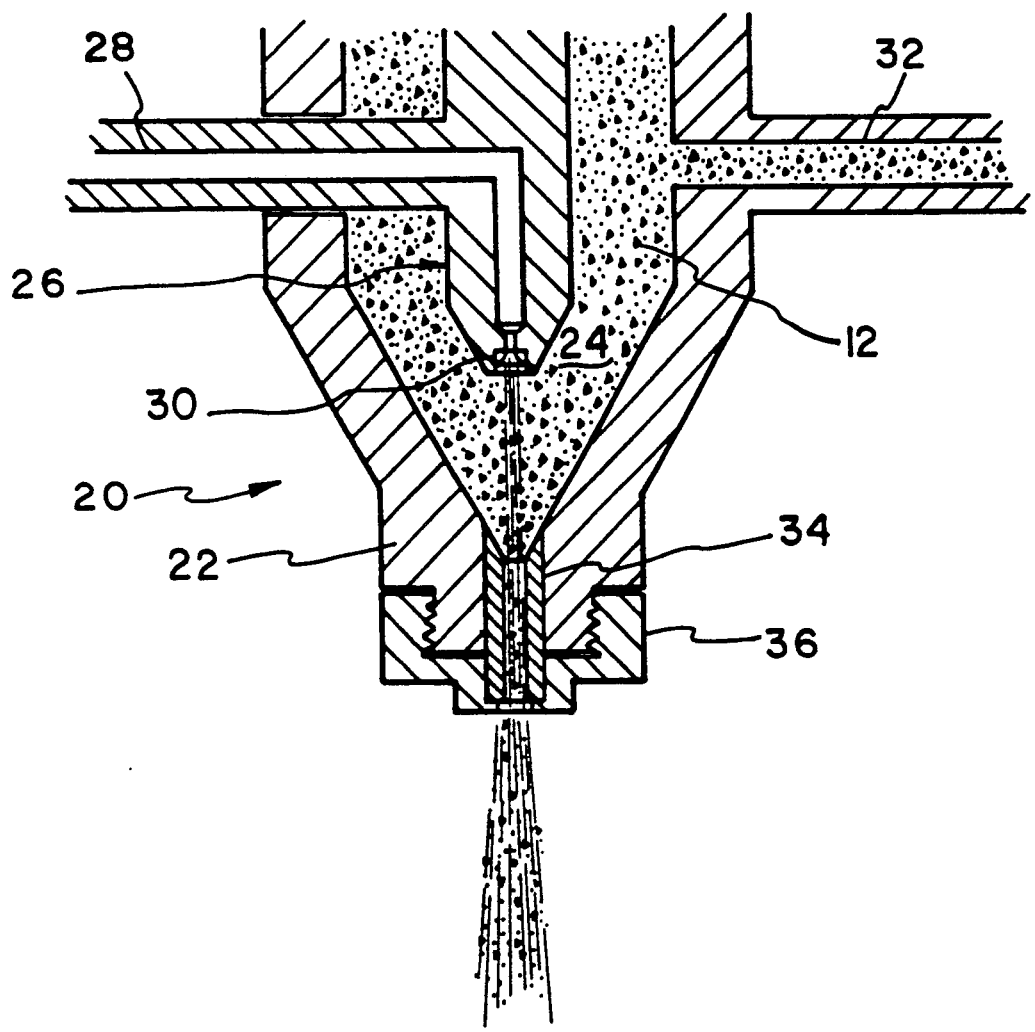
FIG. 2 is a side view in cross section of a high-pressure nozzle suitable for practice of the present invention.

Fluid impact implantation is preferably accomplished by mixing the particulate material with a suitable fluid carrier and spraying the resulting mixture under high pressure onto a workpiece. FIG. 2 illustrates a nozzle assembly 20 suitable for mixing and ejecting a liquid and a powdered particulate material. The nozzle assembly 20 includes a nozzle body 22 which contains a hollow plenum 24 and an internal fluid nozzle 26 which is connected to a fluid supply conduit 28. The fluid nozzle 26 includes a sapphire orifice 30. The plenum 24 is connected to a powder supply conduit 32 through which is supplied a particulate material to fill the plenum 24.

Water pumped through the fluid nozzle 26 is mixed with powdered particulate material in the plenum 24, and the mixture is ejected under pressure through a carbide nozzle 34, which is retained in place by a retaining ring 36. Pressures of from approximately 20,000 to approximately 65,000 psi can be obtained with existing commercially available equipment.

Liquids are the preferred carrier in the method of the present invention because they may be mixed with particulate material to form a slurry that can be pumped under high pressure controlled conditions. However, air and other gases may also be used in particular applications. The particulate material can be driven by compressed gas.

Although water is a preferred and useful fluid medium for many applications, other liquids may be employed for particular applications. For example, highly volatile liquids may be used in applications where it is desired to initially form a high velocity stream consisting of a slurry of a particulate material and a liquid carrier, and where it is also desired that the liquid carrier evaporate substantially or completely to a gaseous state prior to impact, thereby impacting the article with a high velocity stream of particulate material while avoiding the chemical and physical effects of the carrier fluid. Suitable fluid carriers for such applications may include selected chlorofluorocarbons and the low molecular weight hydrocarbons such as propane and butane. Particular fluid carriers in such applications may be selected to achieve minimum chemical reaction or dissolution effects with respect to the polymeric material constituting the article being treated.

Figure 3:
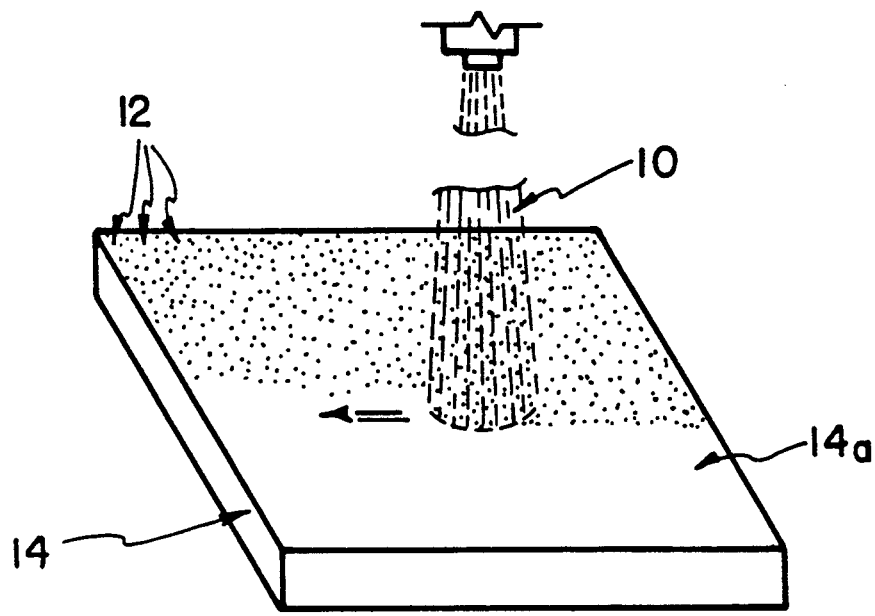
FIG. 3 is a schematic illustration showing an article being implanted with a fluid stream bearing a particulate material, which is scanned across the article in a raster pattern to achieve uniform surface alteration over the area of the article.

In operation, a workpiece is preferably moved systematically beneath a stream of mixed fluid and particulate material, so as to evenly apply the particulate material in any desired pattern and to the desired concentration, as illustrated for example in FIG. 3. The particulate material may be driven by several means. Although a preferred means is the use of a suitable liquid, the material may by air driven, for example by pneumatic pump equipment or by mechanical drivers.

Another means of application is the use of explosive sheet material, sometimes known in the industry as datasheet. In accordance with this variation of the invention, a particulate material is dispersed over the surface of a polymeric article and a sheet of explosive material is placed over the article and detonated. The explosive force creates shock waves which drive the particulate material into the article. The use of explosive sheet material in this manner is advantageous because it can be effectively used to cover large areas evenly by application of a uniform and closely controlled explosive force, also with a minimum amount of explosive material.

Another means of applying the particulate material to polymeric articles is through the use of ultrasonic impact equipment. Ultrasonic impact equipment can be applied to drive the particulate material into the surface of a polymeric article. Typically the particulate material will be applied as a slurry in a liquid carrier, which is applied to the polymeric article with an ultrasonic head or probe.

Finally, the particulate material may be applied to the surface of a polymeric article by direct mechanical application, for example by the use of rollers or by the use rotary dispensers.

Figure 4:
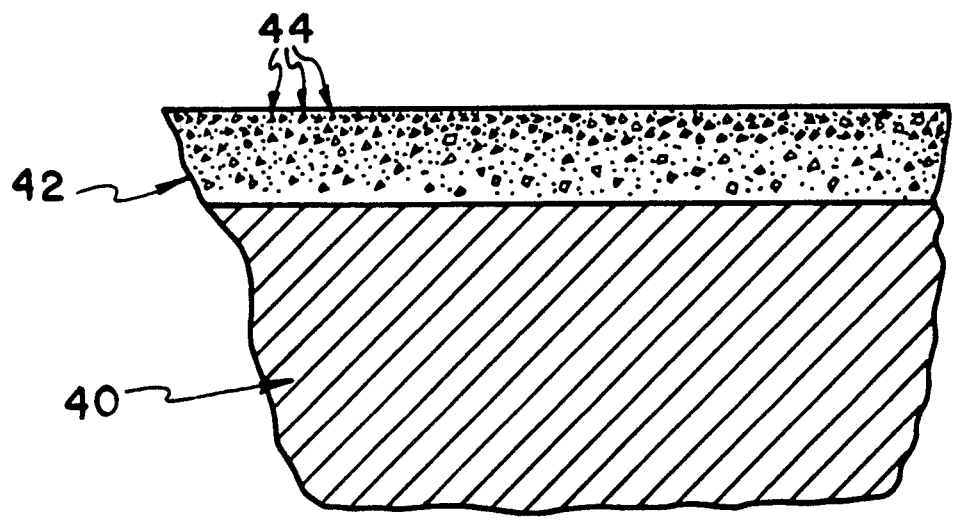
FIG. 4 is a schematic cross section, not necessarily to scale, of a metallic article having a polymeric coating on the surface thereof, which is being implanted with a particulate material.

FIG. 4 illustrates the application of the present invention to an article 40, to which a solid polymeric coating 42 has been applied. The polymeric coating 42 is implanted with a particulate material 44 is the manner described above. This embodiment of the invention is useful in connection with articles, for example metal articles, for which it is desired to employ polymeric coatings having improved surface characteristics. One example is the attainment of erosion resistance in leading edges and surfaces of metallic airfoil structures. An implanted polymeric coating as illustrated in FIG. 4 may be used in such applications to achieve both chemical protection from oxidation and corrosion and physical protection from erosion by rain, sleet and dust.

EXAMPLE 1

A sample of ultra-high molecular weight polyethylene (UHMWPE) was treated in accordance with the present invention, using several different ceramic particulates in series.

The sample consisted of a two-foot strip of UHMWPE which was approximately two inches wide, ⅜ inch thick, and which had a smooth, glossy surface finish. The strip was positioned horizontally at a standoff distance of 27 inches beneath a downwardly directed nozzle of the type described above, which was adapted to receive, mix and dispense under pressure a dilute slurry of water and any one of the several different ceramic particulates. The ceramic particulates actually used in this demonstration included aluminum oxide, boron carbide, silicon carbide, titanium diboride. Also used was a commercially available silicon-aluminum-nitride composition known as Kyon, available from Kennametal Corporation. The size distribution for each of these powdered materials was from 66 to 350 microns (0.0026–0.0138 inch).

The dilute slurry of mixed water and ceramic particulate was sprayed from the nozzle under an operating pressure of approximately 42,000 pounds per square inch (psi). Operating time was in each case on the order of a few seconds.

Due to normal flow divergence of the pressurized slurry stream over the standoff distance of 27 inches, the impact of the slurry stream against the UHMWPE sample was in each case spread over an area of several centimeters, resulting in implantation of the ceramic particulate into the UHMWPE sample over a generally circular area approximately three centimeters in diameter. The strip was moved between each operation in order to obtain discrete areas of implantation with each of the several materials, so that the impregnated areas could be independently evaluated and compared with one another.

Implantation of the surface resulted in each case in permanent retention of the ceramic particulate, accompanied by slight roughening of the original UHMWPE surface over the impregnated area.

EXAMPLE 2

A strip of ultra-high molecular weight polypropylene was used in a second demonstration of the invention. This strip was set up as described above, but was impregnated with a dilute slurry of water mixed with 66–350 micron boron nitride (BN). The operating conditions were otherwise the same as described above for Example 1.

As with the above example, implantation of the polypropylene sample with boron nitride resulted in permanent retention of the boron nitride at and below the surface of the sample, with accompanying slight roughening of the polypropylene surface.

The present invention is particularly useful in the manufacturing of polymeric articles for structural and engineering applications. Engineering plastics employed as moving parts in machines, such as gears, bushings, bearings, cams and the like, can be surface hardened to withstand greater friction and thereby attain improved wear resistance. Plastics employed as surface coatings on metals in aerospace applications and other exterior applications can be treated to withstand weathering and erosion by the elements. Electrical and magnetic properties of articles can be altered to achieve desired properties by surface treatment in accordance with the present invention.

The present invention has been described and illustrated with reference to several preferred embodiments. Nevertheless, it will be understood that various modifications, alterations and substitutions may be apparent to one of ordinary skill in the art, and that such modifications, alterations and substitutions may be made without departing from the essential invention. Accordingly, the present invention is defined only by the following claims.

The embodiments of the invention in which patent protection is claimed are:

1. A method of treating a surface of a solid polymeric article, comprising driving a particulate material by a fluid carrier emitted at a pressure of between approximately 20,000 and 65,000 pounds per square inch so as to achieve impact implantation and penetration of said particulate material into the surface of said article to a depth and concentration sufficient to alter surface characteristics of the article.

2. The method defined in claim 1 wherein said fluid is water.

3. The method defined in claim 2 wherein said particulte material is a ceramic particulate material.

4. The method defined in claim 3 wherein said ceramic particulate material is selected from the group consisting of aluminum oxide ($Al_2O_3$), boron carbide (BC), silicon carbide (SIC), titanium diboride ($TiB_2$), boron nitride (BN), quartz ($SiO_2$), garnet, zircon, and mixtures thereof.

5. The method defined in claim 4 wherein said ceramic particulate material is between approximately 66 to 350 microns in particulate size.

6. The method defined in claim 2 wherein said particulate material is an electrically conductive particulate material.

7. The method defined in claim 2 wherein said particulate material is driven by compressed gas.

8. The method defined in claim 1 wherein said particulate material is driven by shock waves created by detonation of a sheet explosive material.

9. The method defined in claim 1 wherein said particulate material is mechanically driven by mechanical particle dispensing equipment.

10. The method defined in claim 1 wherein said particulate material is an electrically conductive material selected from the group consisting of carbon, titanium diboride, metallic particles or mixtures thereof.

11. The method defined in claim 1 wherein said particulate material is conductive ceramic material.

12. The method defined in claim 1 wherein said particulate material is selected from the group consisting of carbonyl iron, iron ferrites, borides, and mixtures thereof.

13. A method of treating a surface of an article, comprising the steps of coating the article with a solid layer of polymeric material and subsequently driving a particulate material against said solid layer by a fluid carrier emitted at a pressure of between approximately 20,000 and 65,000 pounds per square inch so as to achieve impact implantation and penetration of said particulate material into said layer to a depth and concentration sufficient to alter surface characteristics of the polymer material.

14. The method defined in claim 13 wherein said particulate material is a ceramic material.

15. The method defined in claim 13 wherein said particulate material is between approximately 66 to 350 microns in particle size.

16. The method defined in claim 13 wherein said particulate material is selected from the group consisting of aluminum oxide ($Al_2O_3$), boron carbide (BC), silicon carbide (SiC), titanium diboride ($TiB_2$), boron nitride (BN), quartz ($SiO_2$), garnet, zircon, and mixtures thereof.

17. The method defined in claim 13 wherein said particulate is an electrically conductive material selected from the group consisting of carbon, titanium diboride, metallic particles or mixtures thereof.

18. A method of treating a surface of a solid polymeric article, comprising the steps of:
mixing a particulate ceramic material with a carrier fluid to form a slurry; and
spraying said slurry against said article at a pressure of up to approximately 65,000 pounds per square inch so as to achieve a sufficient velocity to obtain impact implantation and penetration of said particulate material into the surface of said article to a depth and concentration sufficient to alter surface characteristics of the article.

* * * * *